UNITED STATES PATENT OFFICE 2,684,920

ANIMALIZING TREATMENT OF CELLULOSIC MATERIAL WITH ISOMELAMINE RESINS

Edward L. Kropa, Old Greenwich, Conn., assignor to American Cyanamid Company, New York, N. Y., a corporation of Maine No Drawing. Application December 29, 1950, Serial No. 203,557

9 Claims. (Cl. 117—143)

This invention relates to a process for improving the properties of cellulosic materials and more particularly, to the treatment of cellulosic fibers, yarns and fabrics in order to impart improved properties thereto.

In the past, various aminotriazine resins have been used in attempts to improve the properties of cellulosic materials, particularly their affinity for acid dyeing and their water resistance. The resins have differed considerably, one from the other, in their effectiveness as well as in their manner of application.

For example, many non-colloidal aminotriazine resins cannot be added to a viscose dope and the dope thereafter regenerated to produce an animalized cellulosic material; yet, as described and claimed in the copending application, Serial No. 181,564 filed August 25, 1950, now Patent No. 2,654,715, entitled "Animalization of Viscose Rayon," any colloidal aminotriazine resin may be so applied to produce an animalized fiber. Moreover, while these colloidal aminotriazine resins are effective when added to the dope, they have no appreciable animalizing effect when applied to the regenerated fiber as an after-treatment.

Furthermore, while many non-colloidal aminotriazine resins are effective when added to the dope, they have no appreciable animalizing effect when applied to the regenerated fiber as an after-treatment.

Furthermore, while many non-colloidal aminotriazine resins including methylated trimethylol melamines cannot be added to a viscose dope and the dope thereafter regenerated to produce a cellulosic material of improved properties, the members of a small group of such resins, namely, certain alkylated polymethylol melamines very closely related to the ineffective methylated trimethylol melamine, produce a regenerated cellulose of markedly decreased water absorption when added to the viscose dope as described and claimed in the copending application, Serial No. 196,344 filed November 17, 1950, entitled "Treatment of Cellulosic Material."

Up to the time of the present invention, then, it was recognized that (1) the effect of any particular aminotriazine resin on the properties of cellulosic material was unpredictable depending, among other things, on the form of the resin and on its mode of incorporation with the cellulose, and (2) no single resin treatment was known which would result in the production of an effectively animalized cellulosic fiber having markedly decreased water absorption.

According to the present invention we have discovered a particular class of non-colloidal aminotriazine resins which, regardless of their mode of application, impart to cellulose both an affinity for acid dyeing and decreased water absorption.

It is an object of the present invention to produce an animalized cellulosic fiber.

It is another object of the present invention to produce a cellulosic fiber having markedly decreased water absorption.

Still another object of the present invention is to produce an animalized cellulosic fiber of decreased water absorption by application of a resin to the cellulosic fiber.

A further object of the present invention is to produce an animalized cellulosic fiber having decreased water absorption by addition of a resin to a cellulose solution before regeneration thereof.

Another object of the present invention is to produce cellulosic material, i. e., fibers, yarns or fabrics, having an affinity for acid wool dyes.

Still another object of the present invention in the treatment of cellulosic materials with certain aminotriazine resins.

The above and other objects are attained by treating cellulose with an isomelamine-aldehyde resin.

The invention will be described in greater detail in conjunction with the following specific examples in which proportions are given in parts by weight unless otherwise indicated.

Example 1

A 3.5% solution in water of a butyl isomelamine resin prepared as described below and containing about 4% diammonium phosphate, based on the resin, is prepared. This resin solution is applied to viscose skeins and the treated skeins are dried for 10 minutes at 110° C. and cured for 25 minutes at 150° C. After washing in a 0.5% soap solution for 20 minutes at 70° C., the skeins are rinsed, centrifuged and finally dried for 6 minutes at 140°–150° C. After conditioning for about 18 hours at 73° F. and 50% relative humidity, a water absorption of 59.3% is observed. Untreated skeins have a water absorption of about 85%.

After treatment for 1 hour at the boil with a dye solution containing 2.5 parts of Calcocid Alizarine Blue S. A. P. G., 25 parts of sodium sulfate, 52.5 parts of sulfuric acid and 9920 parts of water, a clear bright blue dyeing is obtained.

Example 2

The procedure of Example 1 is repeated with similar results substituting phenyl isomelamine resin prepared as described below for the butyl isomelamine resin. A water absorption of 63.9% is observed.

Example 3

A 3.5% solution in water of a methyl isomelamine resin prepared as described below is applied to viscose skeins which are centrifuged and then cured for 25 minutes at 145° C. After washing, centrifuging and drying as in Example 1, a water absorption of 54.6% is observed.

Preparation of butyl isomelamine resin 109 parts of butyl isomelamine hydrochloride are mixed with 122 parts of 37% aqueous formaldehyde, and the pH of the mixture is adjusted to 7.1 with triethanolamine. It is then refluxed for about 10 minutes to give a clear solution which is cooled and filtered.

Preparation of phenyl isomelamine resin

A mixture of 119 parts of phenyl isomelamine hydrochloride and 122 parts of 37% aqueous formaldehyde is adjusted to a pH of 7.3 with triethanolamine. This causes the mixture to set to a solid mass at about 20°–25° C. The mass is heated to give a clear solution which is cooled and filtered.

Preparation of methyl isomelamine resin

The procedure given above for the preparation of butyl isomelamine resin is repeated using 88 parts of methyl isomelamine hydrochloride and 121.5 parts of 37% aqueous formaldehyde and adjusting the pH of the mixture to 8.0.

Other isomelamine resins may be substituted for those of the specific examples. Aldehyde, i. e., formaldehyde, acetaldehyde, benzaldehyde, furfural, etc., condensation products of isomelamines containing a hydrogen atom attached to each imino nitrogen atom and a hydrocarbon substituent on one of the ring nitrogen atoms, for example, alkyl isomelamines such as methyl isomelamine, propyl isomelamine, hexyl isomelamine, etc., aryl isomelamines such as phenyl isomelamine, tolyl isomelamine, etc., aralkyl isomelamines such as benzyl isomelamine, etc., and the like are examples of suitable resins for application to cellulose material to produce an animalized fiber having low water absorption. The isomelamines may conveniently be represented by the following structural formula:

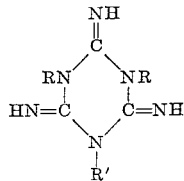

in which R is hydrogen or an alkyl, aryl, or aralkyl hydrocarbon radical and R' is an alkyl, aryl or aralkyl hydrocarbon radical.

The isomelamines in general may be prepared by condensing 1,3-dicyanoguanidine with the corresponding aliphatic or aromatic amine in accordance with U. S. Patent No. 2,481,758. In addition, the methyl and ethyl isomelamines may, if desired, be prepared according to the process described in U. S. Patent No. 2,485,983.

Any acid catalyst generally used to cure aminotriazine resins is suitable for use with the isomelamine resins used in the present process. Such catalysts include hydrochloric acid, phosphoric acid, ammonium chloride, ammonium phosphate, salicylic acid, benzoic acid, phthalic acid, etc. The organic curing catalysts are preferably used with alcohol solutions of resin. If the resin possesses sufficient acidity, addition of an acid catalyst is not necessary as illustrated by Example 3 above.

The resin-impregnated cellulose fiber is heated in order to cure the resin.

It is an advantage of the present invention that the isomelamine resins may be applied to cellulosic fiber, yarn or fabric or added to a cellulosic solution such as viscose prior to regeneration of the cellulose. In either case animalized fiber having decreased water absorption is obtained. In the latter case the resin may be added directly to the viscose dope which is then spun as usual or it may be added to the dope just behind the spinneret in which case an injection spinning procedure is followed.

The water absorption of the cellulose fibers is determined by the following procedure:

Skeins of the cellulosic fibers are washed, dried and conditioned for at least 24 hours at 73° F. and 50% relative humidity. The weight of the conditioned skein is determined by using a stoppered weighing bottle. This weight sample is then soaked in approximately 750 ml. of demineralized water for 15 minutes at room temperature. After this, the skein is opened up and placed on a 15 inch square piece of cotton twill cloth in such a manner that the wet skein forms a circle which meets the edges of the cloth tangentially. The corners of the cloth are turned into the center and the resulting smaller square piece of cloth which now holds the skein is folded into quarters. This whole "package" is soaked in the same water bath for an additional 15 minutes. Then three such triangular "packages" are placed in the 11" diameter perforated stainless steel centrifuge basket with the side of the triangular package holding the skein at the bottom of the basket. The samples are then centrifuged for 3 minutes at 2175 R. P. M. The skeins are quickly transferred to the weighing bottles and the weight of water determined, and in turn the percent water absorption.

I claim:

1. A process which comprises treating a cellulosic material with a quantity sufficient to animalize and reduce the water absorption of said material of a polymerizable condensate of an aldehyde and a compound having the formula:

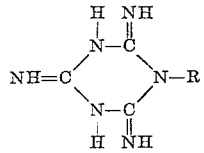

in which R is a radical of the group consisting of aromatic and aliphatic radicals, and heating the treated material under acid conditions to cure the polymerizable condensate.

2. A process which comprises impregnating a cellulosic fiber with a quantity sufficient to animalize and reduce the water absorption of said fiber of a solution of an acid curing catalyst and a polymerizable condensate of an aldehyde and a compound having the formula:

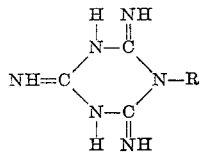

in which R is a radical of the group consisting of aromatic and aliphatic radicals, and curing the condensate in situ by heating the fiber whereby an animalized cellulosic material of low water absorption is obtained.

3. A process according to claim 2 in which the aldehyde is formaldehyde and R is a butyl radical.

4. A process according to claim 2 in which the aldehyde is formaldehyde and R is a methyl radical.

5. A process according to claim 2 in which the aldehyde is formaldehyde and R is a phenyl radical.

6. A cellulosic fiber impregnated with a cured condensate of aldehyde and a compound having the formula:

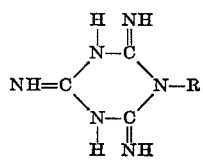

in which R is a radical of the group consisting of aromatic and aliphatic radicals, in sufficient amount to animalize and reduce the water absorption of the cellulosic fiber.

7. A fiber according to claim 6 in which the aldehyde is formaldehyde and R represents a butyl radical.

8. A fiber according to claim 6 in which the aldehyde is formaldehyde and R represents a methyl radical.

9. A fiber according to claim 6 in which the aldehyde is formaldehyde and R represents a phenyl radical.

References Cited in the file of this patent

UNITED STATES PATENTS

| Number | Name | Date |
|---|---|---|
| 2,191,362 | Widmer | Feb. 20, 1940 |
| 2,197,357 | Widmer | Apr. 16, 1940 |
| 2,423,429 | Pollard | July 1, 1947 |
| 2,431,562 | Jacoby | Nov. 25, 1947 |